United States Patent [19]
Haikawa

[11] Patent Number: 5,197,352
[45] Date of Patent: Mar. 30, 1993

[54] FLYWHEEL FOR AN INTERNAL COMBUSTION ENGINE

[75] Inventor: Yuji Haikawa, Yokohama, Japan

[73] Assignee: ISP Corporation, Tokyo, Japan

[21] Appl. No.: 631,447

[22] Filed: Dec. 21, 1990

Related U.S. Application Data

[63] Continuation of Ser. No. 809,779, Dec. 17, 1985, abandoned.

[30] Foreign Application Priority Data

Dec. 21, 1984 [JP] Japan ............................. 59-270370

[51] Int. Cl.$^5$ .......................................... F16F 15/10
[52] U.S. Cl. .................................... 74/574; 74/572; 74/573 F
[58] Field of Search ............... 74/572, 574, 573 R, 74/573 F

[56] References Cited

U.S. PATENT DOCUMENTS

| | | | |
|---|---|---|---|
| 2,525,781 | 10/1950 | Remer | 74/573 F |
| 4,173,158 | 11/1979 | Geislinger | 74/574 |
| 4,200,003 | 4/1980 | Miller | 74/574 |
| 4,208,928 | 6/1980 | Conseur et al. | 74/574 |
| 4,255,163 | 3/1981 | Sonderegger et al. | 74/573 F |
| 4,295,386 | 10/1981 | Zhivotov | 74/573 F |

FOREIGN PATENT DOCUMENTS

| | | | |
|---|---|---|---|
| 2852376 | 7/1980 | Fed. Rep. of Germany | 74/573 F |
| 630537 | 9/1978 | U.S.S.R. | 74/573 F |
| 808738 | 2/1981 | U.S.S.R. | 74/573 F |
| 836539 | 6/1981 | U.S.S.R. | 74/573 F |

OTHER PUBLICATIONS

Vibrating Systems and Sources of Sound, pp. 505-510 of Physics Parts I & II, author Halliday Resnick, Publisher John Wiley and Sons, Inc., 1967 edition.

*Primary Examiner*—Rodney H. Bonck
*Attorney, Agent, or Firm*—Leydig, Voit & Mayer

[57] ABSTRACT

A flywheel is equipped with dynamic dampers in the form of fluid-containing chambers. The fluid in each chamber has a characteristic frequency of oscillation that is a constant multiple of the rotational speed of the flywheel. In preferred embodiments, the characteristic frequency corresponds approximately to the strongest vibrational component produced during the operation of an engine on which the flywheel is mounted. When the flywheel is rotated, the fluid in the chambers vibrates and absorbs vibrations imparted to the flywheel.

18 Claims, 4 Drawing Sheets

FLYWHEEL FOR AN INTERNAL COMBUSTION ENGINE

This application is a continuation of application Ser. No. 809,779, filed Dec. 17, 1985, now abandoned.

BACKGROUND OF THE INVENTION

1. Field of the Invention

The present invention relates generally to a flywheel and more specifically to a flywheel for a device such as an internal combustion engine wherein undesirable vibration produced by the device is absorbed by a fluid body contained in the flywheel.

2. Description of the Prior Art

Figure 1:
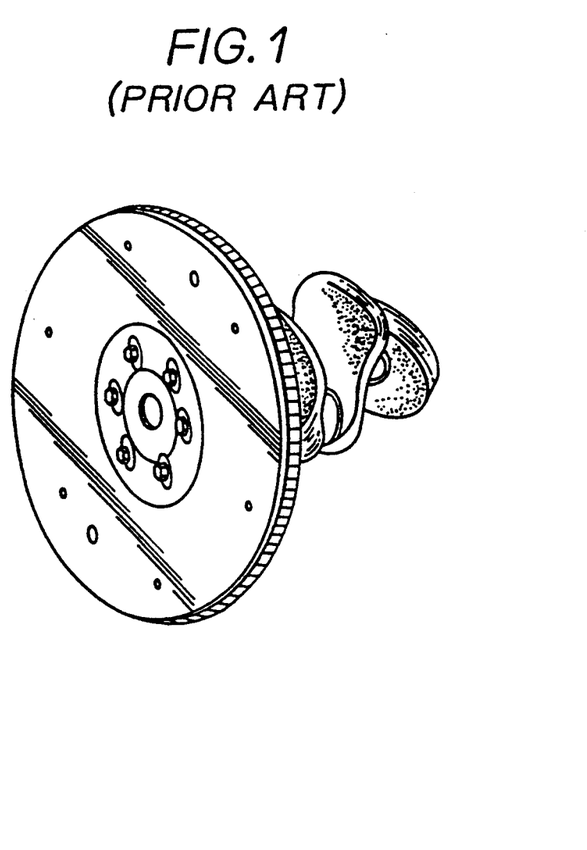
FIG. 1 is a perspective view of a conventional flywheel arrangement.

FIG. 1 of the drawings shows a conventional flywheel attached to one end of a reciprocating engine crankshaft. The arrangement, while being simple and relatively easy to manufacture, suffers from the problem of possessing a relatively large moment of inertia (required to buffer undesirable torque fluctuations and vibration) and thus hampers engine acceleration especially when an automotive vehicle or the like moves off from a stationary start, at which time the load on the engine is very high. Viz., the high moment of inertia of the flywheel adds undesirably to the load on the engine which occurs when the engine speed must be raised while operating under load.

Accordingly, in order to provide adequate engine performance while smoothing out the torque delivered from the engine to the vehicle transmission, it is normally required to increase the power developed by the engine (usually by increasing the displacement thereof) so as to compensate for the load provided by the flywheel. This of course is not economical from the point of fuel economy, etc.

SUMMARY OF THE INVENTION

It is an object of the present invention to provide a flywheel for an automotive vehicle or the like which absorbs undesirable vibration produced by the vehicle engine and which does not incur large moments of inertia, thus permitting ready engine speed acceleration.

In brief, the above object is achieved by an arrangement wherein in order to reduce the moment of inertia of a flywheel, the device is provided with dynamic dampers in the form of liquid-containing chambers. The chambers are shaped and/or dimensioned so that upon being exposed to a predetermined vibration the liquid therein defines fluid bodies which resonate under the influence of the vibration and thus convert it into kinetic energy (liquid movement).

More specifically, the present invention takes the form of a flywheel having a plurality of chambers of predetermined dimensions. A predetermined amount of liquid is disposed in the chambers in a manner to define a fluid body in each chamber. The dimensions of the chambers are selected so that during rotation of the flywheel a predetermined vibration causes the fluid bodies to resonate and convert the vibration into kinetic energy.

BRIEF DESCRIPTION OF THE DRAWINGS

The features and advantages of the present invention will become more clearly appreciated from the following description taken in conjunction with the accompanying drawings in which.

DETAILED DESCRIPTION OF THE PREFERRED EMBODIMENTS

Figure 2:
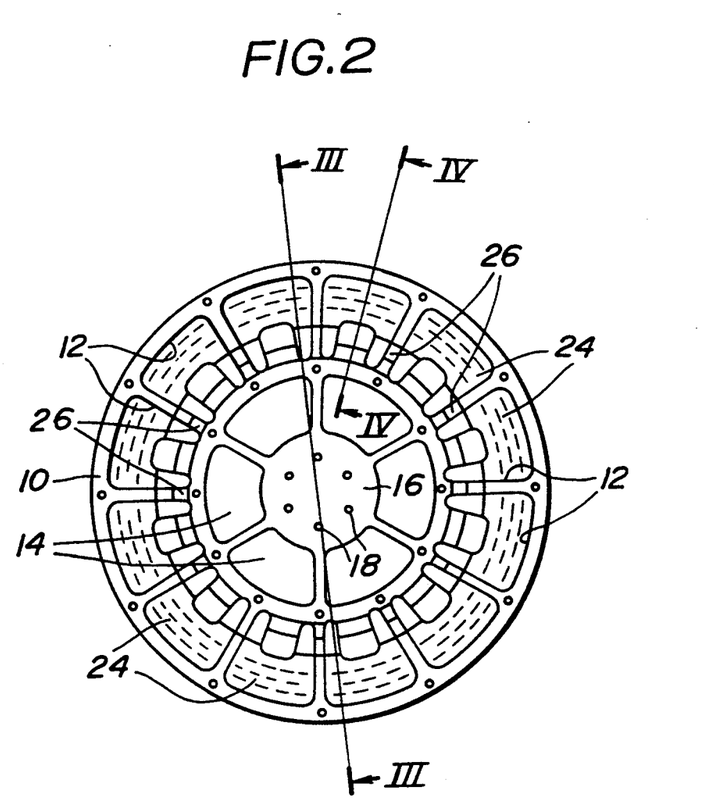
FIG. 2 is a sectional elevation of a first embodiment of the present invention.
Figure 3:
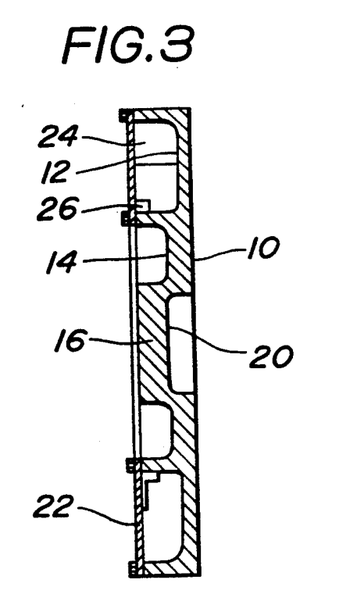
FIG. 3 is a sectional view taken along section line III—III of FIG. 2.
Figure 4:
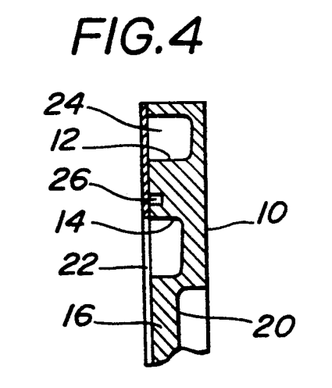
FIG. 4 is a partial sectional view taken along section line IV—IV of FIG. 2.
Figure 10:
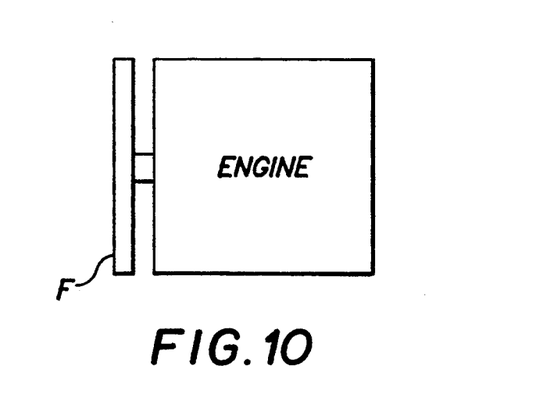
FIG. 10 schematically illustrates a flywheel according to the present invention connected to an engine.

FIGS. 2 to 4 of the drawings show a first embodiment of the present invention. In this arrangement the flywheel is formed of a circular base member 10 formed with a plurality of essentially U-shaped, constant volume recesses 12 about the periphery thereof. A plurality of weight-reducing apertures 14 are formed inboard thereof. The base member 10 is formed with a hub section 16 which is formed with a plurality of bolt holes 18 and a central recess 20 which is adapted to be secured to an end of an engine crankshaft such as the arrangement shown in FIG. 1. Stud bolts (not shown) formed on the crankshaft pass through the bolt holes. FIG. 10 schematically illustrates the flywheel, indicated by reference symbol F, connected to an engine.

An apertured plate member 22 or cover is secured to the face of the base member 10 to sealingly close the U-shaped recesses 12 and thus form closed chambers 24. A seal (not shown) is interposed between the cover 22 and the base member 10 to ensure a hermetic seal. A premeasured amount of liquid is introduced into the chambers 24. This fluid is preferably of high density and may take the form of a concentrated aqueous solution of $ZnI_2$, $ZnBr_2$ or similar inorganic salts. In this embodiment the chambers are all intercommunicated by the provision of passages 26.

With the above arrangement, during engine operation and rotation of the flywheel, the liquid contained in the U-shaped chambers acts as a centrifugal pendulum. By appropriately selecting the dimensions of these chambers it is possible to modify the period of the pendulums such that the strongest or most predominate vibration produced by the engine excites the pendulums into their resonating states and to thus absorb the vibration by converting it into fluid motion.

In order to develop an equation via which the required dimensions of the above-mentioned chambers can be obtained, it is firstly necessary to consider the equation $$T = 2\pi \sqrt{l/2g} \tag{1}$$

wherein
T is the vibration period of the pendulum,
l is the height of the liquid column, and
g is the accelerating force acting on the pendulum.

Now, given that $$g = r\omega^2 \quad (2)$$

wherein
r is the radius of rotation, and
$\omega$ is the angular velocity (rotational speed)
then it can be shown that $$T = 2\pi/\omega \cdot \sqrt{l/2r} \quad (3)$$

which expresses the period in terms of a single variable $\omega$.

Figure 7:
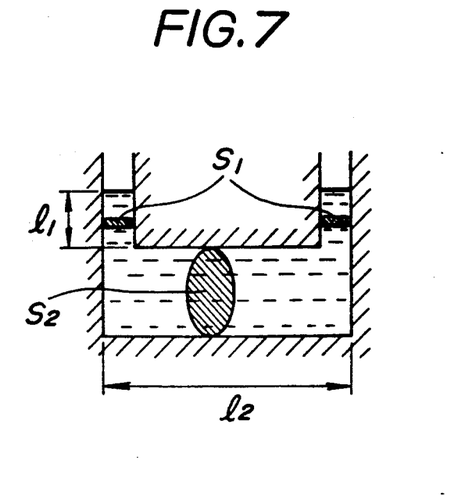
FIGS. 7 and 8 show models which demonstrate the operation of the first and second embodiments.

FIG. 7 shows a model which approximates the centrifugal pendulum which is defined in each of the U-shaped chambers.

In this model, the leg sections of the pendulum have a cross section $S_1$ and a length of $l_1$ while the body of the pendulum has a cross section $S_2$ and a length $l_2$. Using these dimensions it is possible to express the vibrational period T of the pendulum as follows:

$$T = 2\pi \sqrt{(2l_1 + S_1/S_2 \cdot l_2)/2g} \quad (4)$$

Given that the rotational speed of the engine is $\omega_e$ and the characteristic frequency of the liquid column is $\omega_o$, then as $g = r\omega_e^2$ and $\omega_o = 2\pi/T$, it can be shown that $$\omega_o = \omega_e \sqrt{2r/(2l_1 + S_1/S_2 \cdot l_2)} \quad (5)$$

Thus, in the case of a four-cylinder reciprocating engine, if the U-shaped chambers are dimensioned in a manner that
r = 10 cm,
$S_1/S_2 = \frac{1}{3}$,
$l_1 = 1.5$ cm, and
$l_2 = 6$ cm,
then $\omega_o$ approximates the secondary vibrational component $2\omega_e$ of the engine. Viz., the angular velocity at which the pendulum having the above dimensions is excited to resonate corresponds approximately to the strongest vibrational component produced during operation of the engine. In other words, in this case, the characteristic frequency $\omega_o$ is approximately the first harmonic of the strongest vibrational component.

In Equation 5, r, $l_1$, $l_2$, $S_1$, and $S_2$ are all constants for a given flywheel. Therefore, it can be seen that the characteristic frequency $\omega_o$ of the flywheel is a constant multiple of the rotational speed $\omega_e$ of the engine for any rotational speed $\omega_e$. In the above-described example in which the characteristic frequency $\omega_o$ approximates the secondary vibrational component $2\omega_e$ of the engine, the constant multiple is approximately 2. It can also be seen that when the flywheel is applied to a four-cylinder engine, the value of the constant multiple such that the characteristic frequency $\omega_o$ corresponds approximately to the strongest vibrational component is approximately the number of cylinders of the engine (4) divided by 2.

Thus, with the present invention it is possible to convert a given vibration over the entire rotational speed range of the engine by appropriately selecting the dimensions of the chambers 24 and thus avoid a construction which inherently has a high moment of inertia such as that which plagues the FIG. 1 arrangement. Viz., the invention provides a 'dynamic damper' arrangement which can be constructed of relatively light parts and components. Accordingly, when applied to an automotive vehicle this device adequately damps undesirable vibration while permitting an increased amount of torque to be applied to the transmission and final drive rather than being consumed in accelerating a prior art solid flywheel.

With the above-described embodiment, when the engine is stopped, due to the intercommunication between each of the chambers, the liquid contained in the device settles to the bottommost chambers under the influence of gravity. However, subsequent to starting of the engine, the liquid quickly redistributes itself amongst the chambers under the influence of the centrifugal force produced by the rotation of the device.

Figure 9:
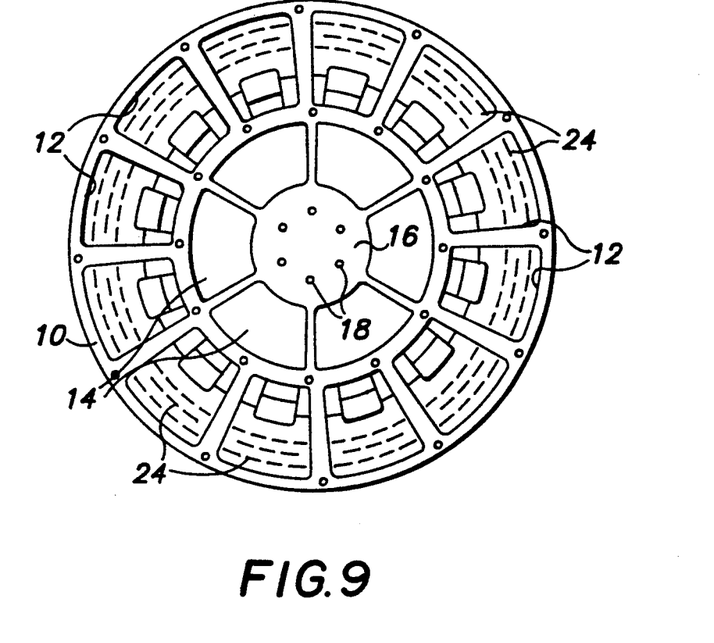
FIG. 9 is a sectional view of another embodiment of the present invention with isolated chamber.

If desired, it is possible to form the chambers individually so that each is sealed from the other. However, in this case care must be taken to accurately meter the appropriate amount of liquid into each chamber. FIG. 9 is a sectional view of such an embodiment. This embodiment is similar to the embodiment of FIG. 2 except that the chambers are isolated from one another.

It should be appreciated that the present invention is not limited to the use of a single type of chamber and several different 'dynamic dampers' which respond to different vibrations can be combined in a single flywheel if so desired.

Figure 5:
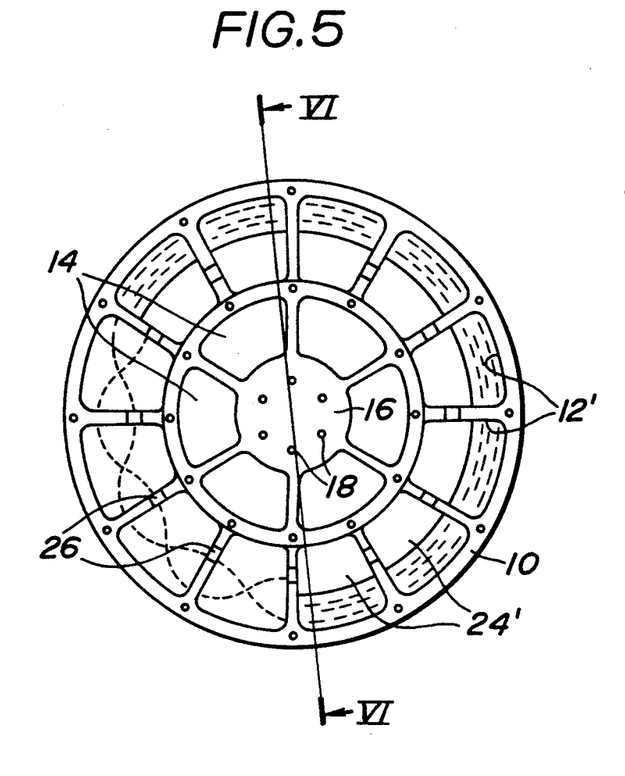
FIG. 5 is a sectional elevation similar to that shown in FIG. 3 but showing a second embodiment of the present invention.
Figure 6:
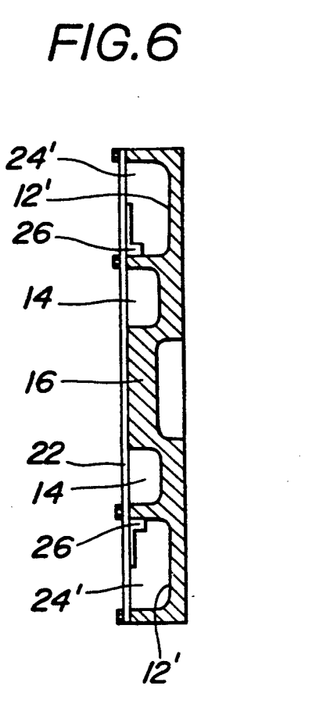
FIG. 6 is a sectional view taken along section line VI—VI of FIG. 5.

FIGS. 5 and 6 show a second embodiment of the present invention. In this arrangement the chambers 24' of the device are not provided with the central projection which defines the U-shape. However, even with this simplified construction an effect similar to that achieved with the first embodiment is possible. Viz., upon the fluid in the chambers being excited to the point of resonance, waves such as shown in phantom in FIG. 5 are generated.

Figure 8:
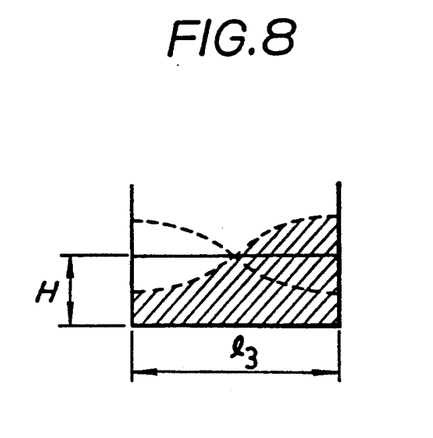

FIG. 8 is a model showing the above phenomenon. As will be appreciated, in this arrangement the vibration of the fluid occurs in the radial direction of the flywheel.

In mathematical terms, given that
H = the depth of fluid (taken in the radial direction of the flywheel),
$l_3$ = the length of the chamber (taken in the circumferential direction of the flywheel), and
k = a whole number integer,
it is possible to express the characteristic vibrational period T as follows:

$$T = \sqrt{(4\pi l_3/kg) \cdot \coth(k\pi H/l_3)} \quad (6)$$

Thus by substituting $g = r\omega_e^2$ and $k = 1$, we obtain $$T = 1/\omega_e \sqrt{(4\pi l_3/r) \cdot \coth(\pi H/l_3)} \quad (7)$$

Since the period T is by definition equal to $2\pi/\omega_o$, when $k = 1$, Equation 7 can be rewritten as follows:

$$T = 2\pi/\omega_o = (1/\omega_e) \sqrt{(4\pi l_3/r) \cdot \coth(\pi H/l_3)} \quad (8)$$

Rearranging terms gives $$\omega_o = (2\pi\omega_e)/\sqrt{(4\pi l_3/r) \cdot \coth(\pi H/l_3)} \quad . \tag{9}$$

Since $l_3$, r and H are all constants for a given flywheel, it can be seen that in this embodiment as well, the characteristic frequency $\omega_o$ is a constant multiple of the rotational speed $\omega_e$ of the flywheel for any rotational speed. This means that the flywheel of the present invention can damp vibrations over the entire rotational speed range of the engine.

In the case of a four-cylinder engine wherein the secondary vibration component $2\omega_e$ is the strongest one generated, by forming the chambers so that the rotational radius r=10 cm, H=3 cm and $l_3$ is approximately 6.9 cm the same effect as achieved with the above-disclosed arrangement which utilizes U-shaped chambers can be expected. In this case, the above-described constant multiple is approximately 2.

In the case of a six-cylinder engine wherein the tertiary vibration component $3\omega_e$ is the strongest one, by appropriately selecting the dimensions of the chambers and the depth of fluid filled therein, a similar dynamic damping effect can be produced.

In this case, if the dimensions of the chambers are selected so that the characteristic frequency approximately equals the tertiary vibration component $3\omega_e$, then the above-described constant multiple equals approximately 3. It can be seen that in a six-cylinder engine, the constant multiple such that the characteristic frequency $\omega_o$ corresponds approximately to the first harmonic of the strongest vibrational component is approximately the number of cylinders of the engine (6) divided by 2, just as in the case for a four-cylinder engine.

What is claimed is:

1. A flywheel connected to an internal combustion engine having n cylinders to absorb vibrations of the engine, the flywheel comprising:
   a base which can be secured to a rotating portion of the engine, the base having a plurality of constant volume chambers formed therein; and
   a liquid which is sealed within the base and partially fills each of the chambers, the liquid in each chamber having a characteristic frequency of oscillation $\omega_o$ when the flywheel is rotated which is a constant multiple of the rotational speed $\omega_e$ of the flywheel over the entire rotational speed range of the flywheel.

2. A flywheel as claimed in claim 1 wherein the constant multiple approximately equals the number of cylinders in the engine divided by two.

3. A flywheel as claimed in claim 1 wherein each chamber contains the same amount of liquid.

4. A flywheel as claimed in claim 1 wherein the characteristic frequency $\omega_o$ corresponds approximately to the strongest vibrational component produced by the operation of the engine when the flywheel is rotating at rotational speed $\omega_e$.

5. A flywheel as claimed in claim 4 wherein the base has a center and each of the chambers is U-shaped and has two leg sections which extend generally radially with respect to the center of the base and a body section which extends between the leg sections, each of the leg sections having a cross-sectional area $S_1$ and being filled with the liquid to a depth $l_1$ as measured from the body section, the body section having a cross-sectional area $S_2$ and a length $l_2$, and the liquid in each chamber having a radius of rotation r, wherein $$\sqrt{2r/(2l_1 + S_1/S_2 \cdot l_2)}$$

equals the constant multiple.

6. A flywheel as claimed in claim 5 wherein the body section extends between the radially outer ends of the leg sections and $S_2$ is greater than $S_1$.

7. A flywheel as claimed in claim 5 wherein each chamber has a bottom surface and a top surface parallel to the plane of rotation of the flywheel.

8. A flywheel as claimed in claim 4 wherein each chamber has a length $l_3$ as measured in the circumferential direction of the base and is filled with liquid to a depth H as measured in the radial direction of the base, the liquid having a free surface extending over the length of the chamber, and the liquid in each chamber having a radius of rotation r, wherein $$2\pi/\sqrt{(4\pi l_3/r) \cdot \coth(\pi H/l_3)}$$

equals the constant multiple.

9. A flywheel as claimed in claim 4 wherein the constant multiple is 2 when the engine is a four-cylinder engine.

10. A flywheel as claimed in claim 4 wherein the constant multiple is 3 when the engine is a six-cylinder engine.

11. A flywheel as claimed in claim 1 wherein the base includes passages for interconnecting adjacent chambers.

12. A flywheel connected to an internal combustion engine having n cylinders to absorb vibrations of the engine, the flywheel comprising:
   a base which can be secured to a rotating portion of the engine, the base having a plurality of constant volume chambers formed therein; and
   a liquid which partially fills each of the chambers when the flywheel is rotated at any rotational speed, the liquid in each chamber having a characteristic frequency of oscillation $\omega_o$ when the flywheel is rotated which corresponds approximately to the strongest vibrational component produced by the operation of the engine when the flywheel is rotating at rotational speed $\omega_e$.

13. A flywheel as claimed in claim 12 wherein the characteristic frequency $\omega_o$ approximately equals the rotational speed $\omega_e$ of the flywheel multiplied by the number of cylinders in the engine divided by two.

14. A flywheel as claimed in claim 12 wherein the characteristic frequency $\omega_o$ is approximately 2 times the rotational speed $f_e$ when the engine is a 4-cylinder engine.

15. A flywheel as claimed in claim 12 wherein the characteristic frequency $\omega_o$ is approximately 3 times the engine rotational speed $\omega_e$ when the engine is a 6-cylinder engine.

16. A flywheel connected to an internal combustion engine having n cylinders to absorb vibrations of the engine, the flywheel comprising:
   a base having a center of rotation and a plurality of constant volume U-shaped chambers formed therein, each of the chambers having a generally circumferentially-extending body section and two leg sections which extend generally radially from the body section towards the center of rotation of the flywheel; and a fluid which partially fills each of the U-shaped chambers and is sealed inside the base, wherein the characteristic frequency of oscillation $\omega_o$ of the liquid in each chamber corresponds approximately to the strongest vibrational component produced by the operation of the engine when rotating at any rotational speed $\omega_e$.

17. A flywheel connected to an internal combustion engine having n cylinders to absorb vibrations of the engine, the flywheel comprising:

a base having a plurality of constant volume chambers formed therein, each of the chambers having a length $l_3$ in the circumferential direction of the base; and a fluid which partially fills each of the chambers to a depth H measured in the radial direction of the base and is sealed within the base and has a radius of rotation r, wherein $$2\pi\omega_e / \sqrt{(4\pi l_3/r) \cdot \coth(\pi H/l_3)}$$

corresponds approximately to the strongest vibrational component produced by the operation of the engine when the flywheel is rotating at rotational speed $\omega_e$.

18. A flywheel connected to a multi-cylinder internal combustion engine to absorb vibrations of the engine, the flywheel comprising:

a base which can be secured to a rotating portion of the engine, the base having a plurality of constant volume chambers formed therein; and a liquid which partially fills each of the chambers, the liquid in each chamber having a characteristic frequency of oscillation $\omega_o$ when the flywheel is rotated which is a constant multiple of the rotational speed $\omega_e$ of rotation of the flywheel for any rotational speed $\omega_e$, wherein the constant multiple approximately equals one-half the number of cylinders in the engine.

* * * * *

UNITED STATES PATENT AND TRADEMARK OFFICE
CERTIFICATE OF CORRECTION

PATENT NO.  : 5,197,352

DATED       : March 30, 1993

INVENTOR(S) : Yuji Haikawa

It is certified that error appears in the above-identified patent and that said Letters Patent is hereby corrected as shown below:

Claim 14, col. 6, line 56, change "$S_e$" to --$W_e$--.

Signed and Sealed this

First Day of February, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,197,352
DATED : March 30, 1993
INVENTOR(S) : Yuji Haikawa

It is certified that error appears in the above-indentified patent and that said Letters Patent is hereby corrected as shown below:

On the Title Page, Item [73], change "ISP Corporation" to
--Nissan Motor Co., Ltd., Yokohama, Japan--.

Signed and Sealed this

Tenth Day of May, 1994

*Attest:*

BRUCE LEHMAN

*Attesting Officer*     *Commissioner of Patents and Trademarks*